No. 617,398. Patented Jan. 10, 1899.
R. L. JOHNSTONE.
REPAIR TOOL.
(Application filed Oct. 25, 1898.)
(No Model.)
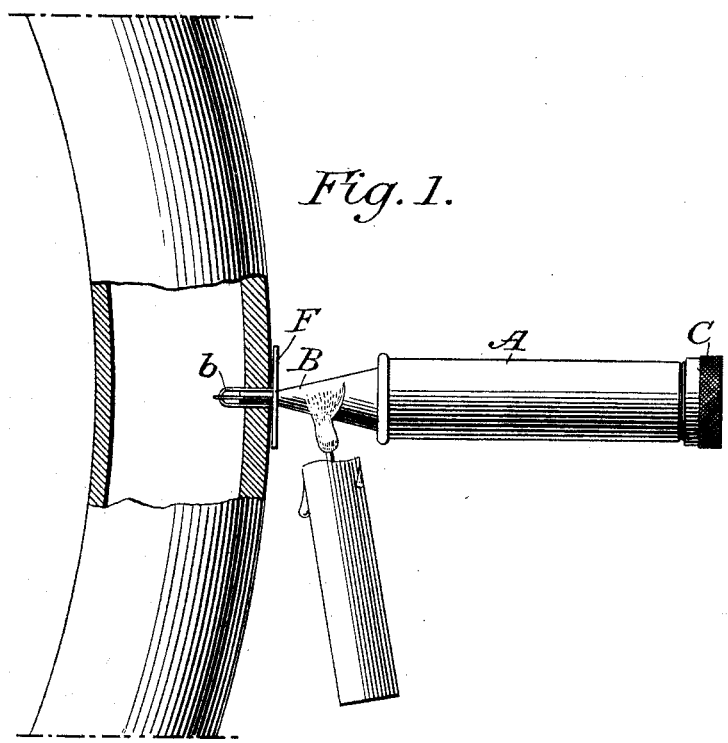
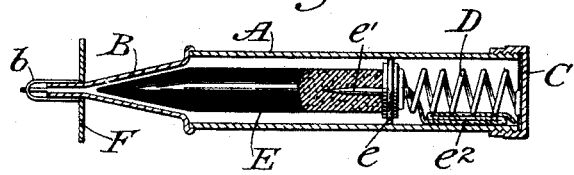

UNITED STATES PATENT OFFICE.

ROBERT L. JOHNSTONE, OF GLEN RIDGE, NEW JERSEY.

REPAIR-TOOL.

SPECIFICATION forming part of Letters Patent No. 617,398, dated January 10, 1899.

Application filed October 25, 1898. Serial No. 694,513. (No model.)

*To all whom it may concern:*

Be it known that I, ROBERT L. JOHNSTONE, a citizen of the United States, residing in the borough of Glen Ridge, county of Essex, State of New Jersey, have invented certain new and useful Improvements in Repair-Tools, of which the following is a specification, reference being had to the accompanying drawings, forming a part thereof.

This invention relates to the general class of devices for the repair of punctured pneumatic tires, hose, &c., by the application to the puncture of a suitable cement; and the object of the invention is to produce a device of this general character which shall be especially adapted for the application of a cement which is a solid under ordinary temperatures, but becomes plastic when exposed to a temperature a little higher than the maximum temperature to which a pneumatic tire is ordinarily subjected in use. It has been sought especially to provide a device which shall cost little, shall occupy very little room, can be used easily and quickly, and shall not subject the tire itself to danger of injury from heat during its use, while the cement itself is applied with certainty at the point where it would be most effective. The device itself will be more particularly described hereinafter with reference to the accompanying drawings, in which it is illustrated in a convenient and practical form.

In the drawings, Figure 1 is a view representing a portion of a bicycle-tire with the repair-tool applied thereto. Fig. 2 is a longitudinal central section of the repair-tool.

As represented in the drawings, the device consists of a short tube A, of any suitable shape in cross-section, having a nozzle B, preferably tapered, so that its extremity can be introduced into an ordinary puncture. The outer end of the tube may be closed by a cap C, which is preferably threaded on the end of the tube. Within the tube is a suitable spring D, which may be conveniently secured to the cap C at one end and at its other end is adapted to engage the stick E of cement. Preferably a piston $e$ is applied to the end of the spring, so that all of the cement when melted may be pushed forward by the spring, and a spur $e'$ may be mounted on the piston to engage the stick of cement. A cord $e^2$ may be attached to the piston for convenience in withdrawing the same when the cement has been completely used and it is desired to recharge the tool. The cement employed is by preference of such a nature that it will melt easily upon the application of a slight degree of heat, such as that furnished by a match or a candle, as represented in the drawings, and will harden or set quickly when the source of heat is withdrawn, not melting at the ordinary temperatures to which the tire is subjected in use. As the heat must obviously be applied for an appreciable length of time, during which the flame of a candle or match might injure the surface of the tire or hose, a flame-guard F is applied to the nozzle B a short distance back of its extremity, serving also as a stop to limit the introduction of the nozzle into the tire, the length of the nozzle beyond the flame-guard being about equal to the thickness of the wall of the tire.

The mode of use of the device will be readily understood. When the puncture is found, the end of the nozzle is pushed into it as far as the flame-guard will permit, and the tire or hose is placed so that the tool shall be in a substantially horizontal position. A lighted match or candle is then applied to the nozzle back of the flame-guard. As the cement becomes plastic it is pushed forward by the pressure of the spring and exudes from the end of the nozzle, forming a button within the tire. When the tool is withdrawn, a small quantity of the cement follows the end of the tool through the puncture and completely closes it. A wire cage $b$ may be applied to the nozzle to spread the cement as it issues therefrom and retain it at the place where it is required.

It is obvious that other means than the spring may be employed, if desirable, for forcing the cement forward.

I claim as my invention—

1. A repair-tool comprising a tube for the reception of a cement rendered plastic by heat, a nozzle, a flame-guard surrounding the nozzle back of its extremity, and means for forcing the cement forward, substantially as shown and described.

2. A repair-tool comprising a tube for the reception of a cement, a nozzle, a piston, a cap, and a spring between the piston and the cap, substantially as shown and described.

3. A repair-tool comprising a tube for the reception of a cement rendered plastic by heat, a nozzle, a flame-guard surrounding the nozzle back of its extremity, a cap for the outer end of the tube, and a spring seated upon said cap for forcing the cement forward, substantially as shown and described.

4. A repair-tool comprising a tube for the reception of a cement, a nozzle, a piston, a spring for forcing the piston forward, and a cord connected to the piston to withdraw the same, substantially as shown and described.

This specification signed and witnessed this 19th day of October, A. D. 1898.

ROBERT L. JOHNSTONE.

In presence of—
ANTHONY N. JESBERA,
W. B. GREELEY.